(12) United States Patent
Phillips

(10) Patent No.: US 10,960,351 B2
(45) Date of Patent: Mar. 30, 2021

(54) METHOD AND APPARATUS FOR CLEANING A CONTAMINATED AIR STREAM

(71) Applicant: ANUA CLEAN AIR INTERNATIONAL LIMITED, Dublin (IE)

(72) Inventor: John Paul Phillips, Terenure (IE)

(73) Assignee: ANUA CLEAN AIR INTERNATIONAL LIMITED, Dublin (IE)

( * ) Notice: Subject to any disclaimer, the term of this patent is extended or adjusted under 35 U.S.C. 154(b) by 392 days.

(21) Appl. No.: 15/368,262

(22) Filed: Dec. 2, 2016

(65) Prior Publication Data
US 2017/0173526 A1  Jun. 22, 2017

(30) Foreign Application Priority Data

Dec. 3, 2015  (EP) ..................................... 15197870

(51) Int. Cl.
*B01D 53/85* (2006.01)
*B01D 53/84* (2006.01)
(Continued)

(52) U.S. Cl.
CPC ............. *B01D 53/85* (2013.01); *B01D 53/02* (2013.01); *B01D 53/52* (2013.01); *B01D 53/72* (2013.01);
(Continued)

(58) Field of Classification Search
CPC ........ B01D 53/85; B01D 53/02; B01D 53/52; B01D 53/72; B01D 53/84; B01D 53/96;
(Continued)

(56) References Cited

U.S. PATENT DOCUMENTS 6,019,810 A †  2/2000  Phillips
7,575,686 B2 *  8/2009  Sengupta .................. C02F 3/04
                                                          210/617
(Continued)

FOREIGN PATENT DOCUMENTS

EP        0402704 A1   12/1990
IE         990601 A1    3/2000
(Continued)

OTHER PUBLICATIONS

Abraham, S; Measurement and Treatment of Nuisance Odors at Wastewater Treatment Plants, UCLA dissertation pp. 1-276; available at https://escholarship.org/uc/item/7486x979, Oct. 2014 (Year: 2014).*

(Continued)

*Primary Examiner* — William H. Beisner
*Assistant Examiner* — Danielle B Henkel
(74) *Attorney, Agent, or Firm* — Chalker Flores, LLP; Daniel J. Chalker

(57) ABSTRACT

A method and apparatus for cleaning a contaminated air stream, the method comprising the step of passing the contaminated air stream through a multistage cleaning reactor, wherein at least two stages of the multistage cleaning reactor comprise marine shell material.

16 Claims, 2 Drawing Sheets

(51) Int. Cl.
*C10L 3/10* (2006.01)
*B01D 53/02* (2006.01)
*B01D 53/52* (2006.01)
*B01D 53/72* (2006.01)
*B01D 53/96* (2006.01)

(52) U.S. Cl.
CPC .............. *B01D 53/84* (2013.01); *B01D 53/96* (2013.01); *C10L 3/103* (2013.01); *B01D 2251/404* (2013.01); *B01D 2251/606* (2013.01); *B01D 2251/95* (2013.01); *B01D 2253/10* (2013.01); *B01D 2256/245* (2013.01); *B01D 2257/304* (2013.01); *B01D 2257/306* (2013.01); *B01D 2257/55* (2013.01); *B01D 2257/708* (2013.01); *B01D 2258/05* (2013.01); *B01D 2258/06* (2013.01); *B01D 2259/124* (2013.01); *Y02A 50/20* (2018.01)

(58) Field of Classification Search
CPC ........ B01D 2251/404; B01D 2251/606; B01D 2251/95; B01D 2253/10; B01D 2256/245; B01D 2257/304; B01D 2257/306; B01D 2257/55; B01D 2257/708; B01D 2258/05; B01D 2258/06; B01D 2259/124; C10L 3/103; Y02A 50/2358
See application file for complete search history.

(56) References Cited

U.S. PATENT DOCUMENTS

2007/0180802 A1* 8/2007 Parker .................. B01D 53/84
                                                              55/485
2008/0216648 A1* 9/2008 Lally ...................... B01D 39/04
                                                              95/45

FOREIGN PATENT DOCUMENTS

| WO | WO2000003789 A1 † | 1/2000 |
| WO | 2002089959 A1 | 11/2002 |
| WO | WO2002089959 A1 † | 11/2002 |

OTHER PUBLICATIONS

Extended European Search Report dated May 17, 2016.
US TM Reg. No. 4522304,1-2, Nov. 13, 2012, TSDR printout for Mark: Mónashell.†
Anua Clean Air International Ltd.—Product Brochure, 1-3, Sep. 12, 2016, available at https://plus.google.com/102621861351910668072 (as of Oct. 10, 2017).†
Torretta V., et al., Application of multi-stage biofilter pilot plants to remove odor and VOCs from industrial activities air emissions, 225-233, 2013, Brebbia et al. (eds.), Energy and Sustainability IV, 176 WIT Transactions on Ecology and the Environment.†

\* cited by examiner
† cited by third party

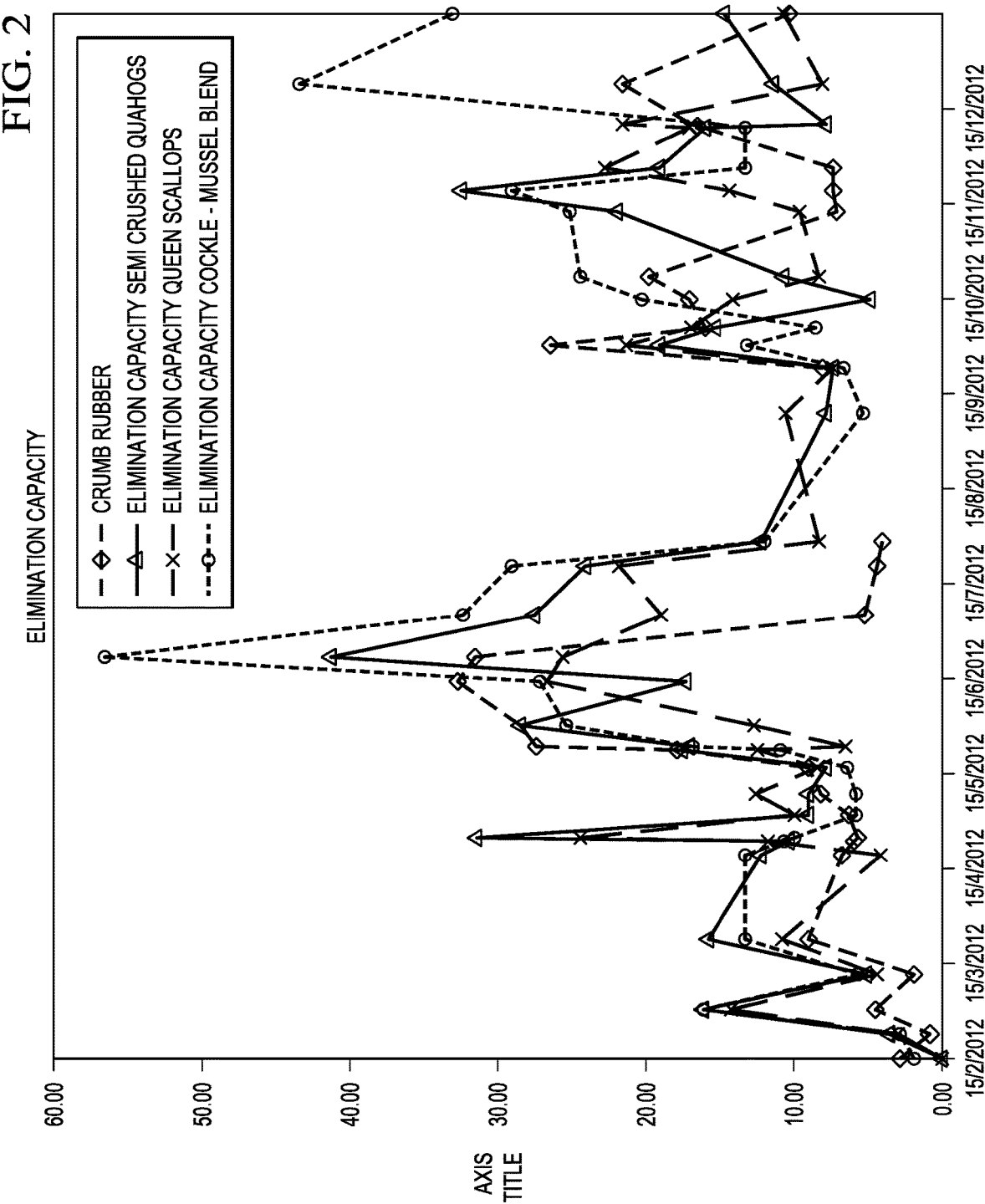

METHOD AND APPARATUS FOR CLEANING A CONTAMINATED AIR STREAM

CROSS-REFERENCE TO RELATED APPLICATIONS

This application claims priority to European Patent Application No. 15197870.7, filed Dec. 3, 2015, the entire contents of which are incorporated herein by reference.

FIELD OF THE INVENTION

This invention relates to a method of cleaning a contaminated air stream to remove odours and volatile organic compounds (VOCs).

BACKGROUND TO THE INVENTION

The invention is suitable for treating waste air streams containing high concentrations of sulphur and other odorous compounds. The origins of the contaminated air stream may be from processing of municipal or industrial wastewater or treatment processes for the by-products of waste water treatment such as bio solids dewatering, drying, pasteurising or physical and chemical and thermal hydrolysis prior to digestion. Such waste air typically contains between 10% and 20% oxygen.

The contaminants in the contaminated air stream may include reduced sulphur compounds such as hydrogen sulphide ($H_2S$), volatile organic compounds and/or organic sulphur compounds. The apparatus 1 is suitable for removing contaminants from the contaminated air stream where the concentration of contaminants is high, for example where the concentration of the hydrogen sulphide ($H_2S$) is greater than 200 ppm, 500 ppm, 1000 ppm, 2000 ppm. The contaminant may comprise of organic sulphur compounds, where the concentration of organic sulphur compounds may be greater than 50 ppm. The contaminant may comprise of volatile organic compounds, where the concentration of volatile organic compounds may be greater than 50 mg/m3.

Biological waste treatment systems are limited in their ability to handle these variable loads. Both bio filtration and bio scrubbing abatement systems have been increasingly successful utilised with low running costs, high performance, high reliability, low maintenance, absence of secondary waste and finally versatility in the range of pollutants that can be treated. One of the major problems with many prior art bio filtration systems is that while they are highly successful in removing $H_2S$, the biological conversion of $H_2S$ generates $H_2SO$ which causes the pH of the system to decrease and if uncontrolled, it can fall to below 4.0 in turn causing inhibition of most biological activity, often referred to as "souring".

Many of these bio filters have peat, woodchip or compost as their medium and the souring has been controlled by either the addition of calcareous material to the organic media often in the form of lime, or the use of a water-sprinkling system to wash off the excess $H_2SO$. While these approaches are reasonably successful, prolonged exposure to levels of $H_2S$ greater than the design level still results in souring which often necessitates pH adjustment.

It has been known to use calcareous material of marine origin as the media or packing material in the construction of biofilter plants. Under microbial activity $H_2S$ converts to $H_2SO$, which then reacts with $CaCO_3$ to produce $CaSO_4$+ $H_2O$+$CO_2$. This ensures that the acid produced is neutralised.

A further problem with organic media bio filtration systems is that while they are often highly efficient at steady state loadings, the efficiency reduces as the loadings increase. A typical design limitation appears to be of the order of 20 ppm $H_2S$ removed at a loading of 100 m3/m3 of media/hour. If there are higher concentrations at source, then dilution is necessary or a reduction in gas flow is required. In some situations the difficulty is overcome by combining off-gases from different locations so as to keep the inlet concentration to the bio filtration system at an acceptable level. Needless to say, the necessity of dilution or reduction in flow rates will result in an increase in the size of bio filter with a corresponding increase in cost and in any event lead to more complex equipment to ensure that the difficulties of peak loadings are overcome.

Another major problem in the use of any biological system is that it is dependent on the activity of the microorganisms present in the system. It is accordingly essential that the efficient seeding of a biological system with bacteria is carried out to ensure that the inoculum is not washed from the filter media before it becomes effectively established. In addition, it is necessary to ensure that the culture survives during periods of starvation as inlet concentrations dip. It is vital that the inoculation bacteria will remain viable even in periods of starvation and are thus usable when it subsequently peaks.

There is a need for a system that will handle high and variable levels of malodorous gases and in particular high and variable levels of $H_2S$. It is an object to provide odour abatement systems which will successfully treat the odorous gases while minimising initial capital cost and subsequent running costs.

WO9635502 (A1) discloses an effluent treatment system for removing effluent gases from a gas stream comprises a packing comprising a plurality of randomly arranged elements of calcareous material. The elements may be spent shells of shellfish, especially half mussel shells and have a liquid retention portion which may form an individual liquid reservoir depending on the orientation of the element with the packing. Suitable bacteria are retained in at least some of the reservoirs. The system may be operated as a bio filter or a bio scrubber.

In this system the calcium carbonate is slow released by the sea shell as it is required to maintain pH. Overtime the media is slowly dissolved and consumed. The life span of the shell media is proportional to its bulk density, and the sulphur loading on the system. For very high concentration air streams ($H_2S$>200 ppm) the media life can be relatively short (12 to 18 months).

There is therefore a need for an improved economically and environmentally sustainable method of cleaning a contaminated air stream, where the method is flexible enough to manage complex air steams containing different dominant compounds and which overcomes the afore-mentioned problems.

SUMMARY OF THE INVENTION

Accordingly, the present invention provides a method of cleaning a contaminated air stream, the method comprising the step of:

passing the contaminated air stream through a multistage cleaning reactor, wherein at least two stages of the multistage cleaning reactor comprise marine shell material.

For cleaning air with high levels of $H_2S$, at least one stage of the multistage cleaning reactor may comprise inert crumb rubber biotrickling material. The at least one stage may further comprises a biological element.

Preferably one of the at least two shell stages comprises shells of a first size, and the other of the at least two stages contains shells of a second size, different to the first size. The method may comprise passing the contaminated air stream through a stage containing oyster shells, and then through a stage containing mussel shells. The method may comprise passing the contaminated air stream through a stage containing American clam shells, and then through a stage containing mussel shells. The method may comprise passing the contaminated air stream through a stage containing oyster shells, and then through a stage containing queen scallop shells. The method may comprise passing the contaminated air stream through a stage containing American clam shells, and then through a stage containing queen scallop shells. The method may comprise passing the contaminated air stream through a stage containing oyster shells, and then through a stage containing cockle shells. The method may comprise passing the contaminated air stream through a stage containing American clam shells, and then through a stage containing cockle shells. The method may comprise passing the contaminated air stream through a stage containing queen scallop shells, and then through a stage containing cockle shells.

The marine shell material may comprise whole or partially whole sea shells. The marine shell material may comprise one or more of mussels shell material, and/or oyster shell material, and/or cockles shell material, and/or American quahogs shell material, and/or queen scallops shell material. The marine shell material may comprise bottom-dredged mussels shell material.

The method may comprise irrigating each stage with water. The method may comprise continuous recirculation of irrigation water for each stage.

The contaminant may be at least one of a reduced sulphur compound, and volatile organic compounds. The sulphur compound may comprise hydrogen sulphide, $H_2S$.

The method may further comprise purging the irrigation water to remove contaminants from the reactor.

There is further provided an apparatus for cleaning a contaminated air stream, the apparatus comprising a multistage cleaning reactor and means for passing a contaminated air stream through the multistage cleaning reactor, wherein at least two stages of the multistage cleaning reactor comprises marine shell material.

At least one stage of the multistage cleaning reactor may comprise inert crumb rubber biotrickling material. The at least one stage may further comprises a biological element.

Passing the contaminated gas through the rubber material facilitates a chemical and/or catalytic reaction between the rubber material and the contaminated gas to remove sulphur from the gas. The rubber is preferably crumb rubber and may be granulated or shredded into pieces. Such rubber material is widely available and inexpensive, for example from used vehicle tyres. As the crumb rubber material is inert, the crumb rubber material offers an almost indefinite media life.

A co-current flow between the water and the gas facilitates a high irrigation rate with a low pressure drop. It is possible to increase the irrigation rate much higher than that of the fine water mist used in prior art rubber filtration systems. Preferably a flow rate in the region of 15-20 L/m3/minute is achieved, in comparison with less than 5 L/m3/minute used in the prior art. The cocurrent flow of the water and gas is essential to achieve these rates.

The method may further comprise recirculating the water. The method may further comprise purging the irrigation water to remove contaminants. Preferably the water is heated. Preferably the water comprises a biological agent.

A biological agent, an inoculant, may be introduced into the irrigation water, such as a facultative autotrophic sulphur reducing bacteria. By adding a biological component to the water, a bioreaction takes place in the water and the crumb rubber is inoculated with facultative autotrophic sulphur reducing bacteria.

Because of a combination of increased irrigation and the biological activity which converts more of the sulphur to soluble sulphate rather than coating the rubber with elemental sulphur, thio-sulphate "coating" of the rubber as experienced with prior art systems does not occur so periodic cleaning is not required. A high biological conversion to sulphate coupled with a high irrigation rate means that a rubber cleaning stage is not essential.

Preferably one of the at least two shell stages comprises shells of a first size, and the other of the at least two stages contains shells of a second size, different to the first size.

The apparatus may comprise at least one stage containing oyster shells, and at least one stage containing mussel shells. The apparatus may comprise at least one stage containing American clam shells, and at least one stage containing mussel shells. The apparatus may comprise at least one stage containing oyster shells, and at least one stage containing queen scallop shells. The apparatus may comprise at least one stage containing American clam shells, and at least one stage containing queen scallop shells. The apparatus may comprise at least one stage containing oyster shells, and at least one stage containing cockle shells. The apparatus may comprise at least one stage containing American clam shells, and at least one stage containing cockle shells. The apparatus may comprise at least one stage containing queen scallop shells, and at least one stage containing cockle shells.

The apparatus may comprise comprising means for irrigating each stage with water. The apparatus may comprise means for continuous recirculation of irrigation water for each stage.

The contaminant may comprise at least one of a reduced sulphur compound and volatile organic compounds. The sulphur compound may comprise hydrogen sulphide, $H_2S$.

The apparatus may further comprise means for purging the irrigation water to remove contaminants from the reactor. Means for controlling the purge of water may further be provided. Water usage is a significant in terms of cost for providing and disposing of water. If this can be minimised it can provide significant saving in running cost.

For the shell stage, the critical parameter is conductivity as pH is maintained by the shells. A conductivity probe can be installed in the recirculating irrigation water and used to maintain conductivity typically below 3000 micro Siemens per cm by the addition of minimum purge water volumes.

The combination of these measures allows for smaller more efficient filters to be installed with improved performance and reduced running costs.

The apparatus may further comprise means for heating the irrigation water. Biological activity is optimum between 25 and 35 degrees C., with a doubling of biological activity for every ten degree rise. Maintaining optimum temperature at the least possible cost therefore gives significant performance benefits.

To preheat the airstream is generally not feasible because of very high energy loads and associated costs. According to one aspect of the invention, water is continuously recirculated so heating the water used to irrigate the filter material is a much cheaper and lower cost option. To further reduce running costs the fresh water being introduced into the system can be preheated using water being released from the system through an indirect heat exchanger.

Ideally the contaminant is removed by a combination of absorption, adsorption and chemisorption followed by biological degradation in the aqueous phase on the surface of the reactor material.

There is further provided a computer-readable medium having computer-executable instructions adapted to cause a computer system to perform the method as set out above.

The degradation by-products in the aqueous phase may comprise soluble and insoluble forms of sulphates, and elemental sulphur. The invention achieves a particularly high rate of cleaning of a contaminated air stream, even for contaminated air streams having a high concentration of contaminants. Between 95% and 99% of the contaminants may be removed from the contaminated air stream using the method of the present invention.

The use of crumb rubber as a prefiltration biotrickling media is far more efficient at removing high levels of $H_2S$ than prior art use of lava rock.

A multistage system is preferable to recirculating contaminated air through a single filter, as smaller fans can be used. In comparison to the prior art system described in EP1383591(A1), a multi stage multi-compartment approach increases the face velocity of the air through the filter which achieves the same effect as recirculation thus improves efficiency and elimination capacity. In addition to this, the resultant effect on the larger heavier shells in the first stage is improved utilization of the heavier media which extends the life span of the more reactive polishing shell in the final stage.

BRIEF DESCRIPTION OF THE DRAWINGS

The invention will be more clearly understood from the following description of an embodiment thereof, given by way of example only, with reference to the accompanying drawings, in which:

FIG. 2 is a graph of results of using the apparatus of FIG. 1.

DETAILED DESCRIPTION OF THE DRAWINGS

Figure 1:
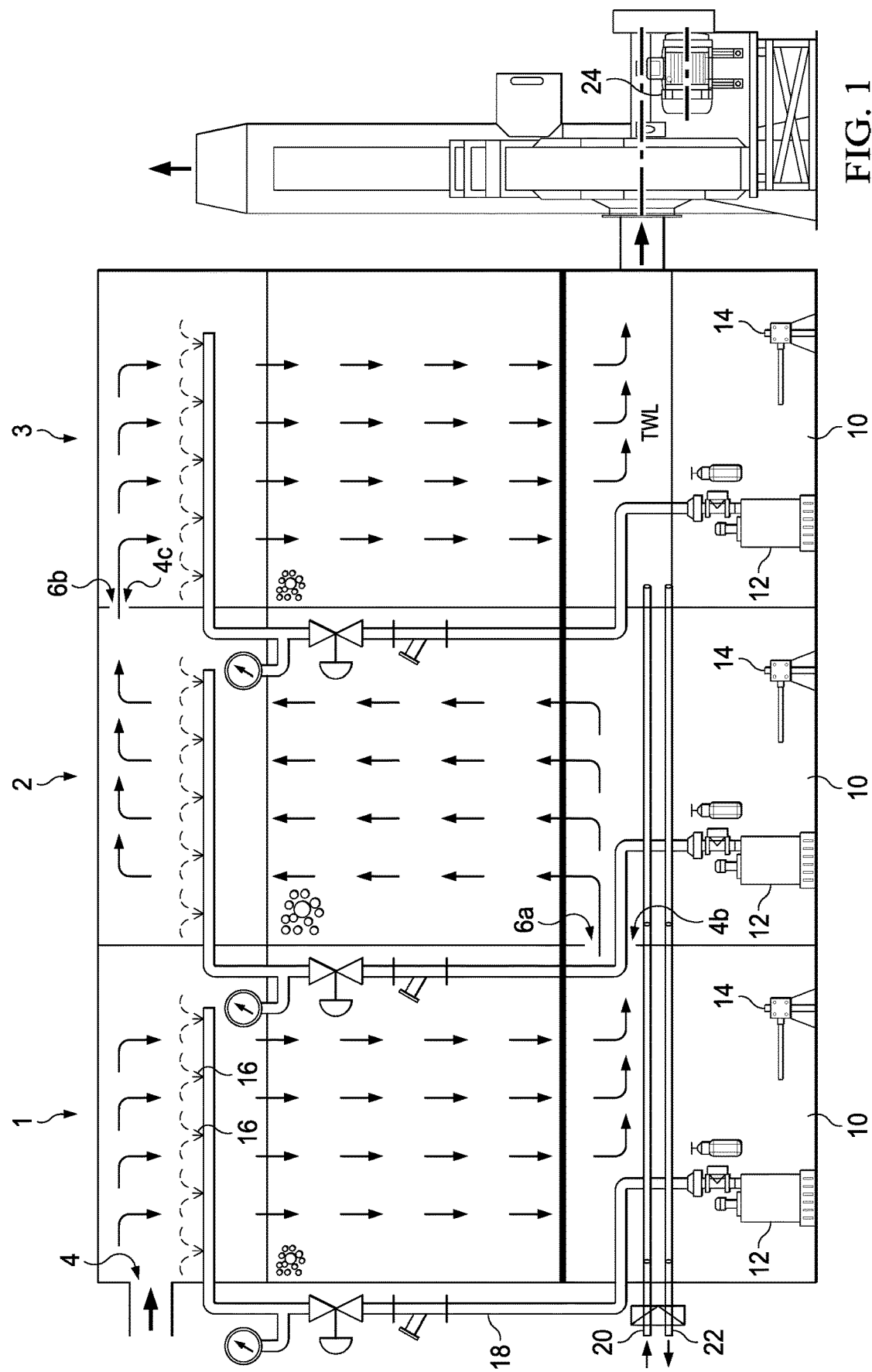
FIG. 1 is an apparatus for cleaning a contaminated air stream in accordance with one embodiment of the invention.

Referring to the drawings there is illustrated one embodiment of an apparatus according to the invention for cleaning a contaminated air stream.

The apparatus is suitable for and may be employed to clean a contaminated air stream originating from waste water treatment processes or treatment processes for the by-products of waste water treatment such as bio solids dewatering, drying, pasteurising or physical and chemical and thermal hydrolysis prior to digestion.

The apparatus 1 comprises a multi-stage reactor, in this embodiment showing three stages, 1, 2, and 3. The only requirement is for the reactor to comprise at least two stages, with no maximum number of stages.

Each stage of the reactor comprises filtration material through which air is passed to be cleaned. At least two reactor tanks house marine shell material to filter the air.

Marine shell material may be sourced as a secondary by-product from the food industry and may comprise whole or partially whole sea shells. The marine shell material may be mussels shell material, and/or oyster shell material, and/or cockles shell material, and/or American quahogs shell material (US clam shells commonly found along the eastern seaboard of USA), and and/or queen scallops shell material. These marine shell materials are widely available and inexpensive. Bottom-dredged mussel shells may be used for their large size, density and weight, which are typically older than rope grown muscles. Shell material of differing botanical species may be used in the same system.

There are enormous and advantages in using the spent shell of shell fish. Firstly, it is a by-product of various food operations in that oysters, whelks, mussels, clams and so on are processed in factories which produce a large amount of spent shells which then have to be disposed of, causing pollution. In any event, the disposal of such shells is expensive. Anything that removes the necessity to spend money on the disposal of the shells but additionally makes them a valuable commodity is obviously extremely advantageous. It has long been appreciated that spent shells of shell fish are a major source of calcium material. It would be wrong to underrate the disposal problem experienced by many shell fish processors. A further advantage of the use of spent shells is that they are of a particularly useful shape in that some of the shells will be broken, others will have their full structural integrity and so on, so that the bed formed by the use of the spent shells will be a bed that will ensure adequate flow of gases and adequate retention and moisture by providing a sufficient number of shells which will form individual liquid reservoirs. It has been found that mussel shell or, more correctly, a half mussel shell is particularly advantageous as there is a large amount of mussel shell available after processing in factories. It is particularly appropriate to use such a shell as it is not alone efficient in use, but equally needs to be disposed of on a regular basis. Thus, the raw material for the initial preparation of the system packing, together with its replacement when the shell used has passed its useful life, is readily available and inexpensive. Further, mussel shell is particularly structurally rigid.

It has been found that mussel shells are one of the most reactive media giving extremely high efficiency and elimination capacities. Mussels shells however have a relatively low bulk density hence the combination of high efficiency and low bulk density gives excellent treatment but a reduced media life on high $H_2S$ applications.

Oyster shells and American Clams on the other hand are a larger shell with a smaller surface area and a higher bulk density. These shells are not as reactive and removal efficiency and elimination capacity tends to be lower than mussels shells. The combination of the reduced efficiency and higher bulk density shell however gives a much longer media life.

Use of marine shell material in the reactor tank facilitates a physical and chemical/catalytic reaction and a biological reactions favourable to neutral pH between the marine shell material and the contaminated air stream. The shell media is particularly suited for the removal of organic sulphur compounds, volatile organic compounds and organic sulphur compounds. Shell media comprises high levels of calcium carbonate which neutralises acid by-products from biological oxidation of sulphur compounds.

Where two stages of shell material are used, it is advantageous to use larger heavier shell material in one stage, followed by smaller more reactive shell material in a subsequent stage. The second shell stage may be a polishing stage wherein the shells buffer and maintain a neutral pH which is required for capture and degradation of volatile organic compounds and volatile organic siloxane.

For high H$_2$S applications, it may be beneficial to incorporate a crumb rubber stage prior to the first shell stage. A biological element may be added to the crumb rubber stage. Crumb rubber acts as a prefiltration media for removing high levels of H$_2$S by a combination of physical and chemical/catalytical/biological means in a low pH environment. The rubber material may be of automotive origin and is widely available and inexpensive. Where crumb rubber is used, it is granulated or shredded into small pieces. As the crumb rubber material is inert, the crumb rubber material offers an almost indefinite media life.

The combination of passing the contaminated air stream through both the rubber material and a dual stage marine shell material has been found to result in highly efficient improved cleaning of the contaminated air stream, in particular in the case of high concentrations of hydrogen sulphide (H$_2$S) and/or organic sulphur, or VOCs in the contaminated air stream. Similar to shell material, rubber material is a widely available and inexpensive, recovered material.

Each stage comprises a reactor chamber housing filtration material, and a pumped recirculating tank 10 which acts as a reservoir to store water for irrigating the filtration medium. The recirculating tank shown in FIG. 1 comprises an irrigation pump 12 and a heater 14 for heating the recirculation water. Each stage comprises at least one spray nozzle 16 to spray water onto the filtration material to irrigate it. Each spray nozzle is fed water via pipe 18 from the reservoir of water formed in the recirculating tank 10. A strainer, diaphragm valve and a pressure gauge are also provided within pipe 18. The arrangement of the reactor chamber over the recirculation tank facilitates the recirculation of the irrigation water and the formation of a water seal to prevent air leaking from the system. The reactor chamber has an air and water permeable floor to hold the filtration medium in place. A water inlet 20 feeds water into each recirculating tank. An overflow pipe 22 is also provided. FIG. 1 also shows a heat exchanger adjacent the overflow outlet pipe. At least one ventilation fan 24 is provided in communication with the outlet of the last stage to transport treated air to atmosphere or for further processing.

Each reactor chamber has an inlet port 4 and an outlet port 6. In the embodiment shown in FIG. 1, the outlet port 6a of the reactor chamber of the first cleaning stage is in air stream communication with the inlet port 4b of the reactor chamber of the second cleaning stage 2. The outlet port 6b of the reactor chamber of the second cleaning stage 2 is in air stream communication with the inlet port 4c of the reactor tank 5 of the third cleaning stage 3. The outlet 6 of stages 1 and 3 is in the recirculating tank 10, while the outlet 6b of the middle stage 2 is in the reactor chamber.

As illustrated in FIG. 1, the contaminated air stream enters the inlet port 4 of the reactor chamber of the first cleaning stage 1, and the cleaned air stream may exit through the outlet port 6c of the reactor tank of the third cleaning stage 3. Arrows demonstrate the direction of flow of air through the multiple stages of the system. In the first stage air flows downwards, in the second upwards and in the third downwards.

The system relies on a continuous recirculation of the water, where at least 95% of the water is recirculated. It may be necessary to purge 5% of the water, however the actual percentage of purged water will depend on the conductivity/pH of the recirculation water. If a crumb rubber stage is included, that stage will have a high purge water rate due to the resultant low pH in that stage.

It will be appreciated that the apparatus may operate by means of a combination of physical adsorption and chemisorption, followed by biological oxidation and breakdown, if crumb rubber is used in an upstream stage and marine shells in a downstream stage.

The apparatus of FIG. 1 provides multi-stage cleaning using crumb rubber and marine shell technology. The multiple stages improve the efficiency of the cleaning process by a combination of increased contact with the surface area resulting from higher face velocities and increased mass transfer from the gaseous to the liquid and solid phase by resulting from increased back pressure at increased face velocities.

The apparatus is effective at removing a large percentage of the contaminants from the contaminated air stream, for example between 95% and 99% of the contaminants from the contaminated air stream. In one test, the apparatus of FIG. 1 achieved between 95% and 99% removal of H$_2$S from the gas stream containing approximately 2000-2800 ppm H$_2$S. H$_2$S is removed by way of absorption and chemisorption followed by the biological degradation in each stage containing marine shell material.

| Media | Average Efficiency % | Efficiency Range % | Average Elimination g/m3/hr | Range Elimination g/m3/hr |
|---|---|---|---|---|
| Crumb Rubber | 33 | 0-40 | 2.90 | 0.9-6.7 |
| Crumb Rubber + Biological | 46.5 | 28-78 | 5.30 | 4-32.2 |
| Crumb Rubber + Biological + Cleaning | 72 | 58-99 | 17.40 | 8.06-29.17 |
| Semi Crushed Quahogs | 70.8 | 7-100 | 14.80 | 3.6-42 |
| Queen Scallops | 56 | 21-95 | 13.80 | 1.8-27 |
| Cockle-Mussel Blend 1 | 60.4 | 18-99 | 13.79 | 1.9-56.6 |
| Cockle-Mussel Blend 2 | 76 | 56-99 | 21.70 | 8.5-43.3 |

FIG. 2 illustrates the results of this testing performed using these various types of marine shell material versus solely crumb rubber material.

The average removal efficiency was 62.5%-70.8%. The average elimination capacity was 12.8-14.8 (g/m$^3$/hr). The removal efficiency and elimination capacity was improved for the cockle/mussel mix compared to a 100% cockle mix. The removal efficiency was 50-70%. The elimination capacity was 12-21.7 (g/m$^3$/hr). Queen scallops provide successful treatment and in the overall performance hierarchy would come third after mussel and Quahogs and before cockles and oysters for H$_2$S. Significant improvement in the crumb rubber efficiency and the elimination capacity was achieved by incorporating the biological component of the marine shell material and performing in-situ cleaning.

Example 2

The following table lists the results of testing performed using various mixtures of marine shell material.

| Media | Average Removal % | Average Loading m³/m³/hr | Average Elimination Capacity g/m³/h |
|---|---|---|---|
| Mussels/Queen Scallops | 72.67 | 77.1 | 17.40 |
| Mussels/Cockles | 64.80 | 85.8 | 17.10 |
| Mussels/Semi Crushed Quahogs | 71.00 | 68.6 | 14.85 |

The mussel/queen scallop mix gave the highest elimination capacity followed by mussel/cockle and mussel/quahog. The multi pass or layered approach is superior to blending medias. Performance was improved by using a higher efficiency spiral nozzle.

The invention is not limited to the embodiment hereinbefore described, with reference to the accompanying drawings, which may be varied in construction and detail. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A method of cleaning a contaminated air stream, the method comprising:
    passing the contaminated air stream through a multistage cleaning reactor, wherein at least two stages of the multistage cleaning reactor comprise a marine shell material, wherein at least one of bulk density, or level of calcium carbonate of the marine shell material in one of the at least two stages differs from that of the marine shell material in another of the at least two stages of the multistage cleaning reactor.

2. The method as claimed in claim 1 wherein at least one stage of the multistage cleaning reactor comprises an inert crumb rubber biotrickling material.

3. The method as claimed in claim 2 wherein the at least one stage of the multistage cleaning reactor further comprises a biological element.

4. The method as claimed in claim 1 wherein the marine shell material comprises whole or partially whole sea shells.

5. The method as claimed in claim 1 further comprising irrigating each stage of the multistage cleaning reactor with water.

6. The method as claimed in claim 5 further comprising purging the irrigation water to remove contaminants from the reactor.

7. The method as claimed in claim 5 further comprising heating the irrigation water.

8. The method as claimed in claim 5 further comprising controlling the purging of the irrigation water.

9. A method of cleaning a contaminated air stream, the method comprising;
    passing the contaminated air stream through a multistage cleaning reactor, wherein at least two stages of the multistage cleaning reactor comprise a marine shell material; and
    further comprising passing the contaminated air stream through one of:
    at least one stage of the multistage cleaning reactor containing American clam shells, and then through at least one stage containing mussel shells; or
    at least one stage of the multistage cleaning reactor containing oyster shells, and then through at least one stage of the multistage cleaning reactor containing queen scallop shells; or
    at least one stage of the multistage cleaning reactor containing American clam shells, and then through at least one stage of the multistage cleaning reactor containing queen scallop shells; or
    at least one stage of the multistage cleaning reactor containing oyster shells, and then through at least one stage of the multistage cleaning reactor containing cockle shells; or
    at least one stage of the multistage cleaning reactor containing American clam shells, and then through at least one stage of the multistage cleaning reactor containing cockle shells; or
    at least one stage of the multistage cleaning reactor containing queen scallop shells, and then through at least one stage of the multistage cleaning reactor containing cockle shells.

10. An apparatus for cleaning a contaminated air stream, the apparatus comprising a multistage cleaning reactor and means for passing the contaminated air stream through the multistage cleaning reactor, wherein at least two stages of the multistage cleaning reactor comprises a marine shell material, wherein at least one of bulk density, or level of calcium carbonate of the marine shell material in one of the at least two stages differs from that of the marine shell material in another of the at least two stages of the multistage cleaning reactor.

11. The apparatus as claimed in claim 10 wherein at least one stage of the multistage cleaning reactor comprises an inert crumb rubber biotrickling material.

12. The apparatus as claimed in claim 10 further comprising means for irrigating each stage of the multistage cleaning reactor with water.

13. The apparatus as claimed in claim 12 further comprising means for heating the irrigation water.

14. The apparatus as claimed claim 12 further comprising means for purging the irrigation water to remove contaminants from the reactor.

15. An apparatus for cleaning a contaminated air stream, the apparatus comprising:
    a multistage cleaning reactor and means for passing the contaminated air stream through the multistage cleaning reactor;
    wherein at least two stages of the multistage cleaning reactor comprises a marine shell material; and
    wherein:
    at least one stage of the multistage cleaning reactor containing American clam shells, and at least one stage of the multistage cleaning reactor containing mussel shells; or
    at least one stage of the multistage cleaning reactor containing oyster shells, and at least one stage of the multistage cleaning reactor containing queen scallop shells; or
    at least one stage of the multistage cleaning reactor containing American clam shells, and at least one stage of the multistage cleaning reactor containing queen scallop shells; or at least one stage of the multistage cleaning reactor containing oyster shells, and at least one stage of the multistage cleaning reactor containing cockle shells; or at least one stage of the multistage cleaning reactor containing American clam shells, and at least one stage of the multistage cleaning reactor containing cockle shells; or at least one stage of the multistage cleaning reactor containing queen scallop shells, and at least one stage of the multistage cleaning reactor containing cockle shells.

16. The method as claimed in claim 1, further comprising a non-transitory computer-readable medium having computer-executable instructions adapted to cause a computer system to perform the method of passing the contaminated air stream through the multistage cleaning reactor.

\* \* \* \* \*